US008757997B2

(12) United States Patent
Alimenti

(10) Patent No.: US 8,757,997 B2
(45) Date of Patent: Jun. 24, 2014

(54) DEPOSITED HARD SHELL AND SOFT CHEWY CENTER CANDY AND METHOD OF MAKING

(75) Inventor: Richard Alimenti, Salem, NH (US)

(73) Assignee: Original Gourmet Food Company, Inc., Salem, NH (US)

(*) Notice: Subject to any disclaimer, the term of this patent is extended or adjusted under 35 U.S.C. 154(b) by 113 days.

(21) Appl. No.: 13/531,985

(22) Filed: Jun. 25, 2012

(65) Prior Publication Data

US 2013/0004622 A1 Jan. 3, 2013

Related U.S. Application Data

(60) Provisional application No. 61/503,194, filed on Jun. 30, 2011.

(51) Int. Cl.
*A23G 3/12* (2006.01)

(52) U.S. Cl.
USPC ........ 425/126.2; 425/130; 425/200; 425/259; 425/261; 425/447

(58) Field of Classification Search
CPC ...... A23G 3/0257; A23G 3/125; A23G 3/563
USPC ............... 425/126.2, 130, 200, 259, 261, 447
See application file for complete search history.

(56) References Cited

U.S. PATENT DOCUMENTS

| | | | | |
|---|---|---|---|---|
| 3,125,037 | A | * | 3/1964 | Johnston .......................... 99/355 |
| 4,229,484 | A | * | 10/1980 | Steels et al. .................... 426/279 |
| 4,372,942 | A | * | 2/1983 | Cimiluca ...................... 424/440 |
| 6,413,564 | B1 | | 7/2002 | Klacik et al. |

FOREIGN PATENT DOCUMENTS

| | | |
|---|---|---|
| GB | 2219725 A * | 12/1989 |
| GB | 2475789 A * | 6/2011 |

OTHER PUBLICATIONS

Shaflur Rahman, Handbook of Food Preservation, Marcel Dekker, 1999, p. 164.*
Baker Perkins update, "ServoForm lollipop depositor", dated Jul. 14, 2007 by the wayback machine.*
Baker Perkins news release, "Energy saving technology for confectionary cooking", Aug. 23, 2011.*
Helen Glaberson, "New Baker Perkins cooker to boost energy savings for confectioners", Confectionarynews.com, Mar. 23, 2011.*
Baker Perkins catalog, "Baker Perkins Quality Confectionary", dated Oct. 11, 2010 by the Wayback Machine.*
Interview of Richard Alimenti entitled "Using Technology for New, Better Gourmet Pops", published May/Jun. 2010 issue of Candy and Snack Today.

* cited by examiner

*Primary Examiner* — Robert B Davis
(74) *Attorney, Agent, or Firm* — ZIP Law PLLC; Claire Zopf

(57) ABSTRACT

A hard candy, namely lollipops, suckers or similar confectionary comestibles and a method of making and packaging the same by a depositing manufacturing process which produces a multi-colored and multi-flavored lollipop which colors and flavors extend entirely through the lollipop body and hard shell and are visible in the final packaging and particularly to a double depositing method incorporating a soft chewy center into a deposited lollipop body which soft center is entirely surrounded by and of a different consistency and viscosity from the hard outer candy shell.

8 Claims, 9 Drawing Sheets

DEPOSITED HARD SHELL AND SOFT CHEWY CENTER CANDY AND METHOD OF MAKING

FIELD OF THE INVENTION

The present invention relates to a hard candy, namely lollipops, suckers or similar confectionary comestibles and a method of making and packaging the same by a depositing manufacturing process which produces a multi-colored and multi-flavored lollipop which colors and flavors extend entirely through the lollipop body and hard shell and are visible in the final packaging. The invention also relates to a double depositing method incorporating a soft chewy center into a deposited lollipop body which soft center is entirely surrounded by and of a different consistency and viscosity from the hard outer candy shell.

BACKGROUND

The manufacture of hard candy, including mints, tarts, suckers, and lollipops, has evolved from simple handmade cooking, mixing, molding and flavoring techniques to sophisticated manufacturing technology and integrated candy manufacturing process lines which can efficiently produce millions of pieces of tasty hard candies. The machines used in such process lines are often highly automated computer controlled and have user friendly touch screen interfaces facilitating operator control and monitoring. Manufacturing equipment integrated with sophisticated electronics, sensors and programmable controllers to produce such hard candies is the current state of the art.

There are many manufacturing control technologies involved in candy manufacturing as well as many types of candy manufacturing equipment. There are machines made for specific processes as well as complete integrated candy manufacturing processing and packaging lines. Some examples of candy manufacturing equipment are for example mixing and cooking apparatus, aerating equipment, candy molds, candy cooling and coding apparatus, automatic decorators as well as candy wrapping and packaging equipment. The contemporary machines used in such manufacturing solutions are generally highly automated and sensor controlled.

An example of hard candy manufacturing equipment is the apparatus and equipment used for the manufacture of lollipops. Pops, suckers or lollipops are a well-known hard candy manufactured throughout the US and around the world. Lollipops are often prepared in large cooking vats such as vacuum cookers where the solid pop starts from raw materials such as sugar water and flavoring. These raw materials are mixed in the vacuum cooker into a pliable mass of candy, generally in a slurry form for further processing. The slurry is introduced into a mold and presented for a lollipop stick insertion into the warm slurry before being cooled and hardened. After removal from the mold the lollipop is polished and packaged into appropriate wrappers and containers and then the container(s) are shipped to stores, distributors and customers.

Hard candy is known to be made by a process known as "depositing". Depositing consists of an automatic way of filling, or depositing into molds confectionary slurry, however the process is subject to many variables which are difficult to control and to attain a high end candy product. Furthermore, it has been particularly difficult with known processes to deposit both the slurry for the complete outer portion of a hard candy lollipop while providing a soft center which is entirely encompassed within the hard candy outer shell. Known depositing machines and processes have substantial difficulty in handling different materials and cooperatively depositing materials with different viscosities.

Soft candy centers such as those found in Blow Pops or Tootsie Pops are made by an extrusion, cutting and rolling process different from depositing. Hard candy pops such as Blow Pops or Tootsie Pops are made generally with the raw ingredients for the candy coating combined in large vats. These include sugar, corn syrup, coloring and flavorings. The candy is then heated and stirred to allow the sugar to melt and combine with the flavorings. This smooth liquid is cooled slightly and poured into a machine that pours the candy onto a conveyor belt, creating a long ribbon of the hard candy coating. While this ribbon is still warm, it is shaped into a long snake or rope and kept warm and pliable.

Long sheets of white paper are cut to the length of the stick, which is about 2½ inches long. These sheets are tightly wrapped around themselves with each one creating a stick. A light coating of food-grade wax is applied to prevent the paper from dissolving when the sucker is put into a mouth. The bubble gum or tootsie center is mixed with sugar and flavorings in large vats. These are then combined, and the finished gum or tootsie soft center is fed into an extruding machine that creates a long rope similar to that of the candy coating. This is then wrapped around one end of a stick with a machine that also shapes the bubble gum into a sphere. These gum-wrapped sticks are then sent to a similar machine, which wraps the candy coating on the outside of it. Once the candy exterior is added, the lollipops are cut and dropped into a cooling drum. As the drum turns, it polishes, cools and maintains the rounded shape of the Blow Pops. After several minutes, the cooled Blow Pop suckers are sent to be wrapped. This is a significantly more expensive and involved material handling process than merely mixing and depositing processes for hard candy.

OBJECTS AND SUMMARY OF THE INVENTION

In one embodiment, the invention relates to a hard candy, particularly a hard candy lollipop in the range of 25-35 grams, and more specifically about 31 grams which is manufactured by a depositing apparatus in a variety of designs, namely solid single color hard candy, two color striped hard candy, center filled striped hard candy, and short term layer hard candy and hard candy.

In the embodiments with at least two color/flavor stripes, the two colors penetrate entirely through the hard candy shell. In other words, neither color is merely a surface coating and each of the at least two colors could also embody separate flavors. For purposes of discussion, such a combination "color/flavor" feature may be referred to generally as either "flavor" or "colors".

One object of the present invention is to produce a deposited lollipop which comprises a plurality of adjacent colors and/or flavors on an outer surface of the lollipop which overlap in an axial manner relative to a longitudinal axis of the lollipop and penetrate substantially entirely through the body of the lollipop.

Another object of the present invention is to produce a deposited lollipop which comprises a plurality of adjacent colors and/or flavors which overlap on an interior portion of the lollipop body in a radial manner relative to a radius of the lollipop and penetrate substantially entirely through the body of the lollipop.

Yet another embodiment of the present invention provides for a deposited lollipop which comprises a soft chewy center which is enrobed by a hard candy shell and the soft chewy center and the hard candy shell are substantially different viscosities.

A still further embodiment of the present invention is a method of making a lollipop by a depositing technique which produces a deposited lollipop having at least two adjacent different colors and also contains a soft chewy center having a different consistency from the outer hard candy shell.

A yet still further embodiment of the present invention is to develop an operational standard for manufacturing of deposited lollipops on standard glucose and sugar recipes at about a 31 gram weight which develops an output of about 250-300 lollipops per minute.

Another embodiment of the present invention is the packaging of the deposited lollipops in a manner which permits a purchaser to view substantially the entire outer surface of the lollipop design while providing the appropriate indicia on the packaging to facilitate the sales and documentation of sales of the lollipop.

The present invention relates to a candy comprising a spherical body comprised of at least a first and a second comestible ingredient affixed on a linear shaft support; an outer surface of the spherical body defined by the first and second comestible ingredients forming a non-uniformly layered composite; and wherein the first and second comestible ingredients of the non-uniformly layered composite are divided by a plurality of non-uniform boundaries.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which.

DETAILED DESCRIPTION OF THE INVENTION

Figure 1:
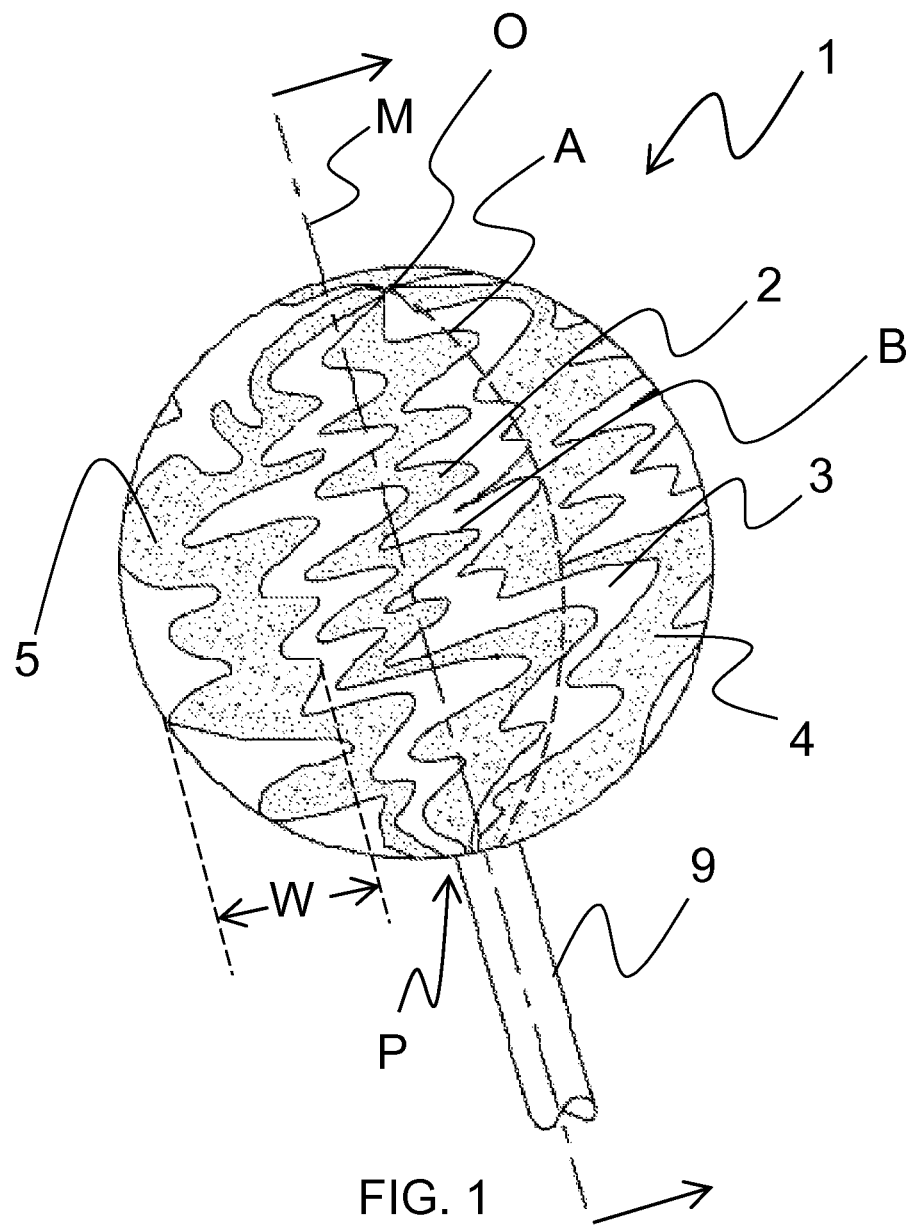
FIG. 1 is a perspective view of a spherical lollipop of the present invention.

FIG. 1 shows a hard candy, specifically a spherical lollipop 1, having a two-color striped outer shell. The adjacent stripe segments 2, 3 and 4 by way of example, on the outer surface of the lollipop are a non-uniform, variable width composite visibly emanating from a substantially single point of origin O on the sphere. The present embodiment includes a plurality of generally non-uniform segments represented by segments 2, 3 and 4 which are immediately adjacent one another on the lollipop 1. Segments 2 and 3 are immediately adjacent and have a different visual appearance and are of different confectionary ingredients and taste, and share a common boundary B, while on the other hand for example segments 2 and 4 are of the same confectionary ingredient(s) and taste, and are substantially separated by segment 3 each having a common origin O. It is to be appreciated that segment 2 and 4 could also be different from one another and segment 3. On the outer surface of the lollipop 1, each segment extends from a point near or adjacent the point of origin O on the spherical lollipop in a unique, varied, and non-uniform width from the point of origin O of the spherical lollipop, and importantly in a non-linear generally sinusoidal manner along a longitudinal axis or path towards a stick insertion point P on a lower portion of the lollipop sphere where the non-uniform segments come together again. Like snowflakes, no two segments are shaped exactly alike. The segments 2, 3 and 4 generally tend to come together again at the stick insertion point P, however the end point of each of the segments does not have to be directly at the stick insertion point P, but could coincide near or adjacent the point P as well.

The non-linearity and non-uniformity of the stripe segments 2, 3 and 4 is further defined by adjacent stripe segments, for example segments 2 and 3, being axially overlapping and layered on top of one another. It is to be appreciated as discussed in detail below that even separated stripe segments such as 2 and 4 can also be axially overlapping. The axial overlapping of the segments 2, 3 and 4 is accomplished generally without compromising the integrity of the adjacent stripes, i.e. maintaining each segment 2, 3 and 4 in a substantially contiguous sinusoidal manner extending from the point of origin O without crossing or intersecting boundaries B. It is to be appreciated that with such layering the boundaries B of adjacent segments might coincide or cross with other boundaries as well. Importantly, the uniqueness and non-uniformity of the segments is defined by the varying width W of each segment as measured along a line of latitude about the lollipop body. The segments 2, 3, and 4 do not grow consistently or uniformly wider from the point or origin, but are actually varying thicker and thinner in width W along the longitudinal path of the segment extending from the point of origin O to an end point at or adjacent the stick insertion point P.

Each segment 2, 3 and 4 for example is unique and non-uniform in width W along its longitudinal axis or path and provides this unique structural and visual application by axially layering or, in other words, axially overlapping spaced apart portions of similar stripe segments of the lollipop. By longitudinal axis or path, is meant the surface length of a longitudinal line A as shown in FIG. 1 as traversed by the segment(s) between point of origin O and the end point of the segment 2, 3 and 4 at or adjacent the insertion point P. This longitudinal line A is not unlike a global line of longitude along the surface of the lollipop body. By the term, axially overlapping is meant that either or both adjacent segments 2, 3 and 4 may overlap along the longitudinal line A drawn like a line of longitude along the surface of the spherical lollipop as shown in FIG. 1. The spaced segments 2, 3 and 4 may be of the same or different color, ingredients etc., but in any event each segment intersects, crosses, or touches at some point along its axial length the longitudinal axial line A so that at least adjacent segments 2, 3, if not all the segments 2, 3 and 4 axially overlap at least partially along the axial line A. The single point of origin O can be the axial center of the lollipop as defined for instance by a supporting lollipop stick defining the main axis M of the lollipop, or the point of origin O can also be off-axis from the stick 9 and main axis M on the lollipop. It is to be appreciated that the longitudinal boundaries B as shown are substantially sinusoidal but could also be toothed with straight portions, curved, wiggled, swirled or otherwise non-linear and non-uniform as shown in FIG. 1.

Figure 2:
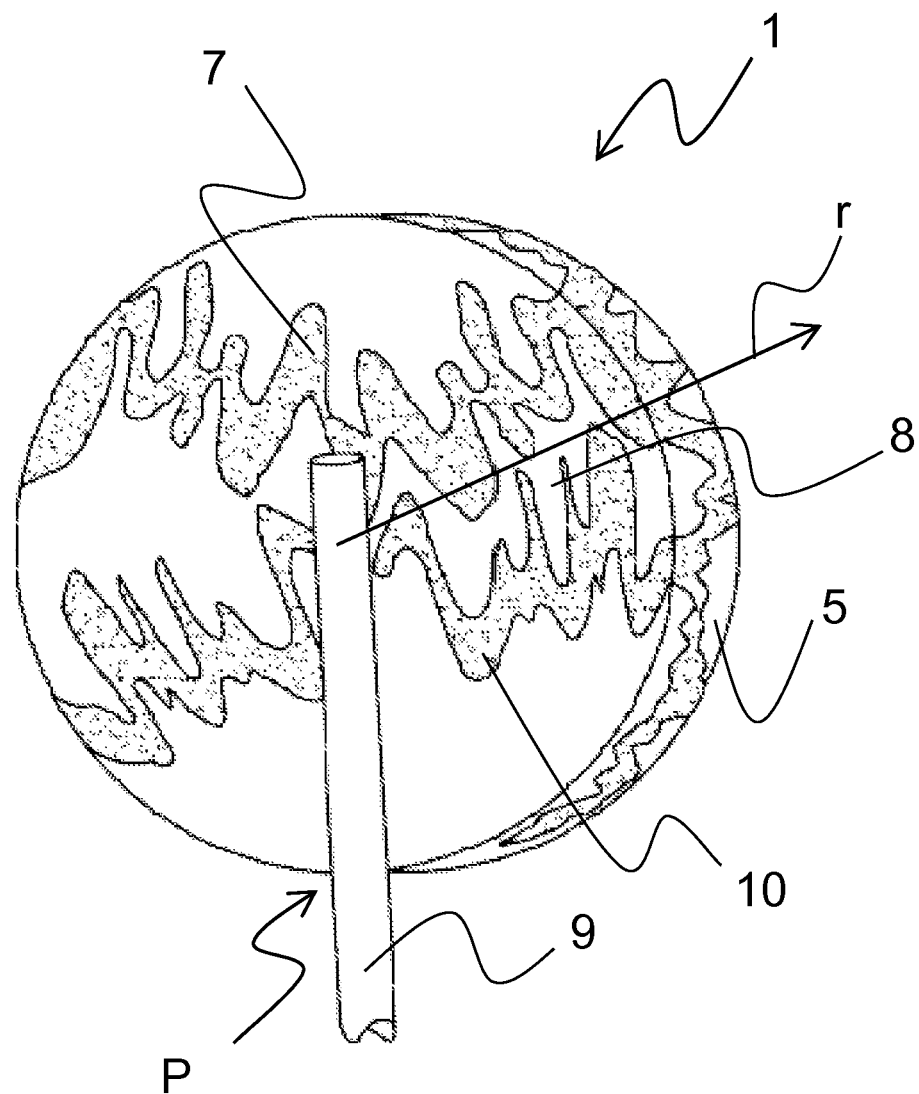
FIG. 2 is a cross-sectional view of a spherical lollipop of the present invention.

Turning to FIG. 2, a cross-section of the lollipop 1 is shown where the stripe segments 2, 3 and 4 extend into the interior of the spherical lollipop and these interior segments 7 extend essentially entirely through the spherical body of the lollipop. The insertion of the lollipop stick 9 may interfere, impact or alter the interior segments 7, 8 and 10 to the extent that it is inserted into the lollipop 1 before the flowable mass of candy ingredients cools and hardens and thus contacts and affects the interior segments 7, 8 and 10. Critically, the stick insertion does not substantially affect the visual appearance of the stripe segments 2, 3 and 4 on the outer exterior surface 5 of the spherical lollipop 1 since even if the stick 9 interrupts an interior segment 7, 8, 10 for example, the segment still extends from the outer surface to the stick. The lollipop stick is inserted centrally and approximately ¾ of the way through the axial length (i.e. the diameter) of the spherical lollipop, but other ranges of between ¼ and ⅞ through the lollipop are contemplated as well.

In the above embodiments, the adjacent segments 2, 3, as well as separated stripe segments 2 and 4, are also layered, axially overlapping, non-linear and non-uniform on the outer surface 5. Furthermore as the interior segments 7, 8 and 10 extend radially through the interior of the spherical body or hard outer shell of the lollipop, there are at least two differently colored or flavored separated interior segments 7, 8 which radially overlap as shown in FIG. 2. Similar to above with respect to the axially overlap of segments 2, 3 and 4 on the exterior surface of the lollipop 1, the separate interior segments 7, 8 and 10 overlap in a radial manner i.e. along a radius r. In other words, the segments 7, 8 and 10 radially overlap by crossing, intersecting or touching the radial line r at certain points. This gives not only a distinct appearance to the outer surface of the lollipop in a store and sales, marketing setting, but also maintains the distinct stripe segment structure, appearance and flavor intermixing on the interior of the lollipop 1 as the lollipop 1 is consumed.

Figure 3:
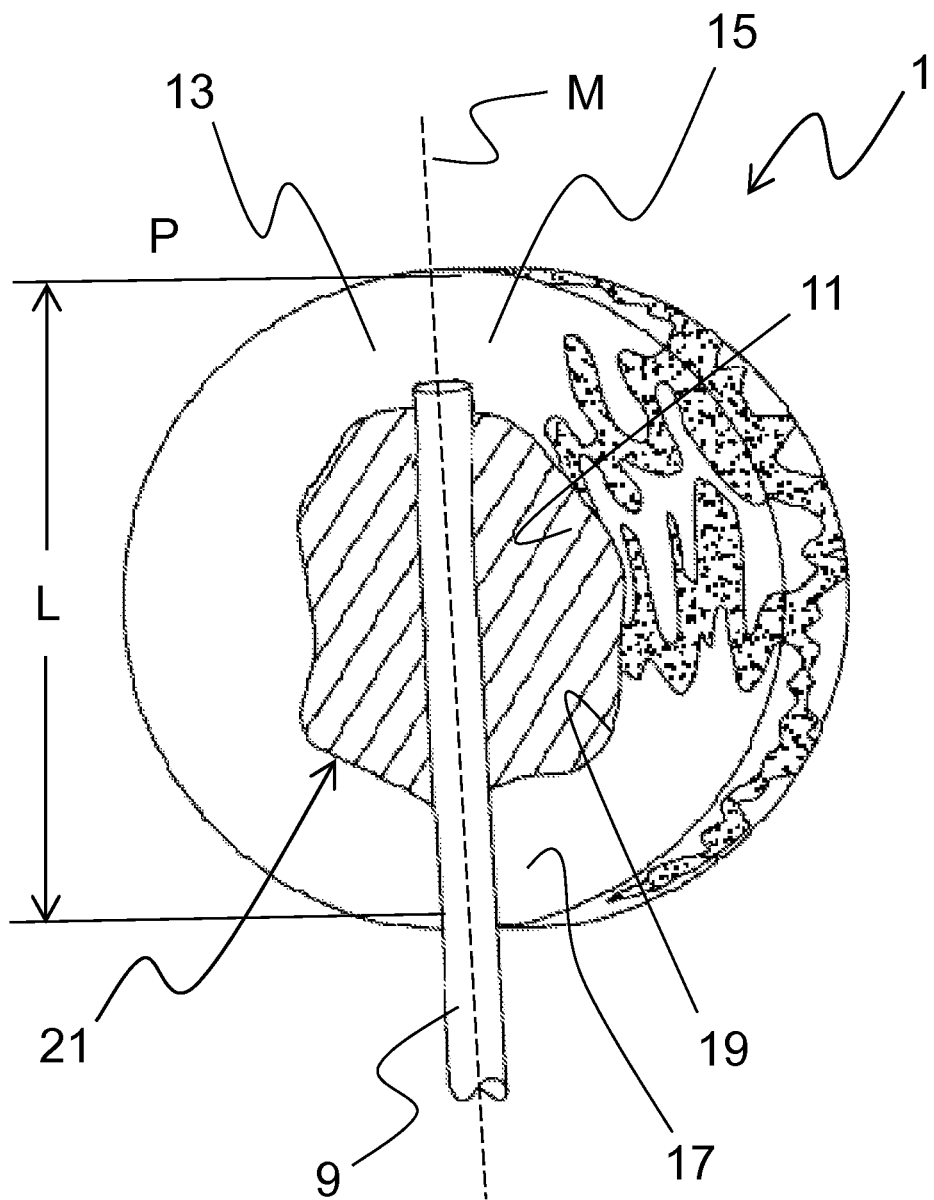
FIG. 3 is a cross-sectional view of the spherical lollipop of the present invention including a chewy center surrounded by a hard shell lollipop.

In a still further embodiment of the present invention shown in FIG. 3 the interior of the spherical lollipop 1 may include a soft chewy center 11 which has a different consistency and even ingredients from the hard outer shell portion 13 of the spherical lollipop 1. The soft center 11 is substantially entirely surrounded by the hard outer shell portion 13 of the lollipop 1 and the lollipop stick 9 passes substantially through or entirely through the soft chewy center 11 to engage both an upper and lower portions 15, 17 of the hard spherical outer shell 13 so that the spherical lollipop 1 is held securely on the stick 9. Another important aspect of this embodiment is that the adjacent stripe segments 2, 3 and 4 visible on the exterior surface of the lollipop 1 extend entirely through the hard outer shell 13 from the exterior surface 5 of the lollipop to an internal surface 19 of the lollipop 1 defining an interior cavity 21 for the soft chewy center 11. It is to be appreciated that the deposited soft center lollipop can also be made in a single color, flavor etc., i.e. without any stripe segments.

Whichever embodiment of the deposited lollipop, another important aspect of the present invention is the deposit manufacturing of such a lollipop 1 either without a soft chewy center as in FIGS. 1 and 2, or as a shell 13 in combination with the soft chewy center 11 as seen in FIG. 3. The soft chewy center 11 may be glucose or sucrose based candy or other similar type food material such as chewing gum which is made of different ingredients from the hard outer shell 13, but most importantly having a substantially different final consistency and viscosity than the hard outer shell 13. The soft center 11 is entirely encompassed within the cavity 21 defined by the outer shell without a seam or rolling of the outer shell 13 around the soft center 11 and has a substantially less viscous final material property than the hard-cracked outer shell 13. The lollipop stick 9 in the soft center embodiment may extend entirely through the soft center 11 having a first end inserted through the hard outer shell 13, entirely through the bottom portion 17 of the outer shell 13, through the soft center 11, and partially into an upper portion 15 of the hard outer shell 13. This placement is important from the standpoint of ensuring that the lollipop body as a whole is firmly attached to the lollipop stick 1 by having two spaced apart portions of the stick 9 firmly embedded in the hard-cracked outer shell.

In the process described below is a detailed description of a depositing method and apparatus for manufacturing the lollipop embodiments described above. This method and apparatus includes the steps of double depositing, i.e. depositing both the hard outer shell portion of the lollipop in conjunction with the depositing of the soft chewy center in cooperation with the depositing step for the outer shell portion. As shown generally in FIG. 4, the lollipop manufacturing process generally includes a premix stage 31 communicating with a water source 29, a plurality of ingredient and material storage bins/containers 32 and a heated glucose storage tank 33 to accommodate the delivery, mixing, cooking and heating in respective apparatus to prepare an initial candy slurry for a cooking stage 35 in a microfilm cooking apparatus 36 explained in further detail below. Next a depositing stage 37 is provided where the cooked slurry is deposited by an incorporator 39 into mold(s) 41 where the slurry is cooled and eventually discharged for polishing and wrapping. In the deposition stage 37 the slurry is delivered in a predetermined manner by the incorporator into individual molds 41 where portions of the slurry are deposited and prepped for the stick insertion apparatus (not shown), and finally cooling, polishing and wrapping of the hardened lollipop. The premix stage 31, microfilm cooking apparatus 36, incorporator 39 and depositing stage 37 of the process are monitored and controlled by a process controller C which sends and receives data from a variety of component controllers S in the premix, cooking and deposition stages.

Figure 4:
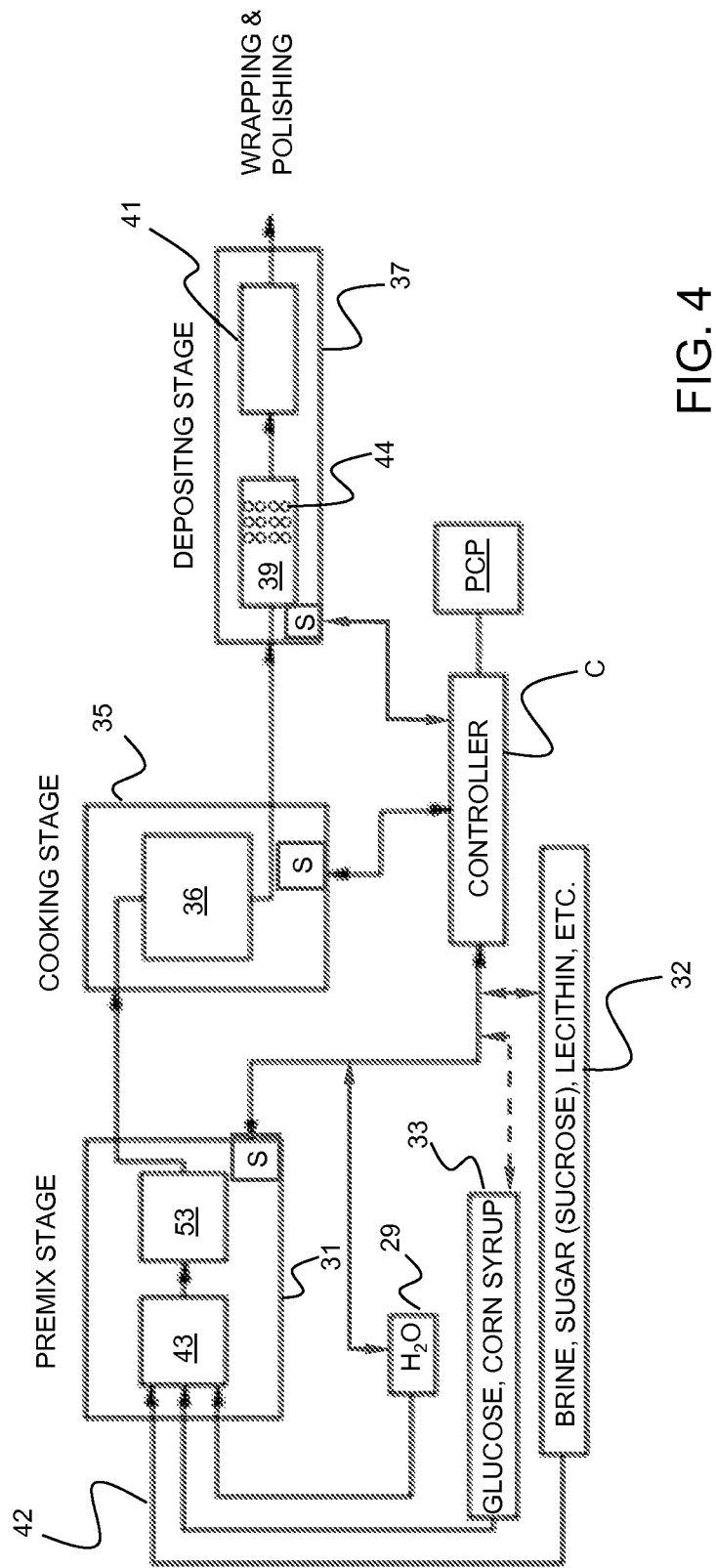
FIG. 4 is a general diagrammatic representation of the complete depositing process.
Figure 5:
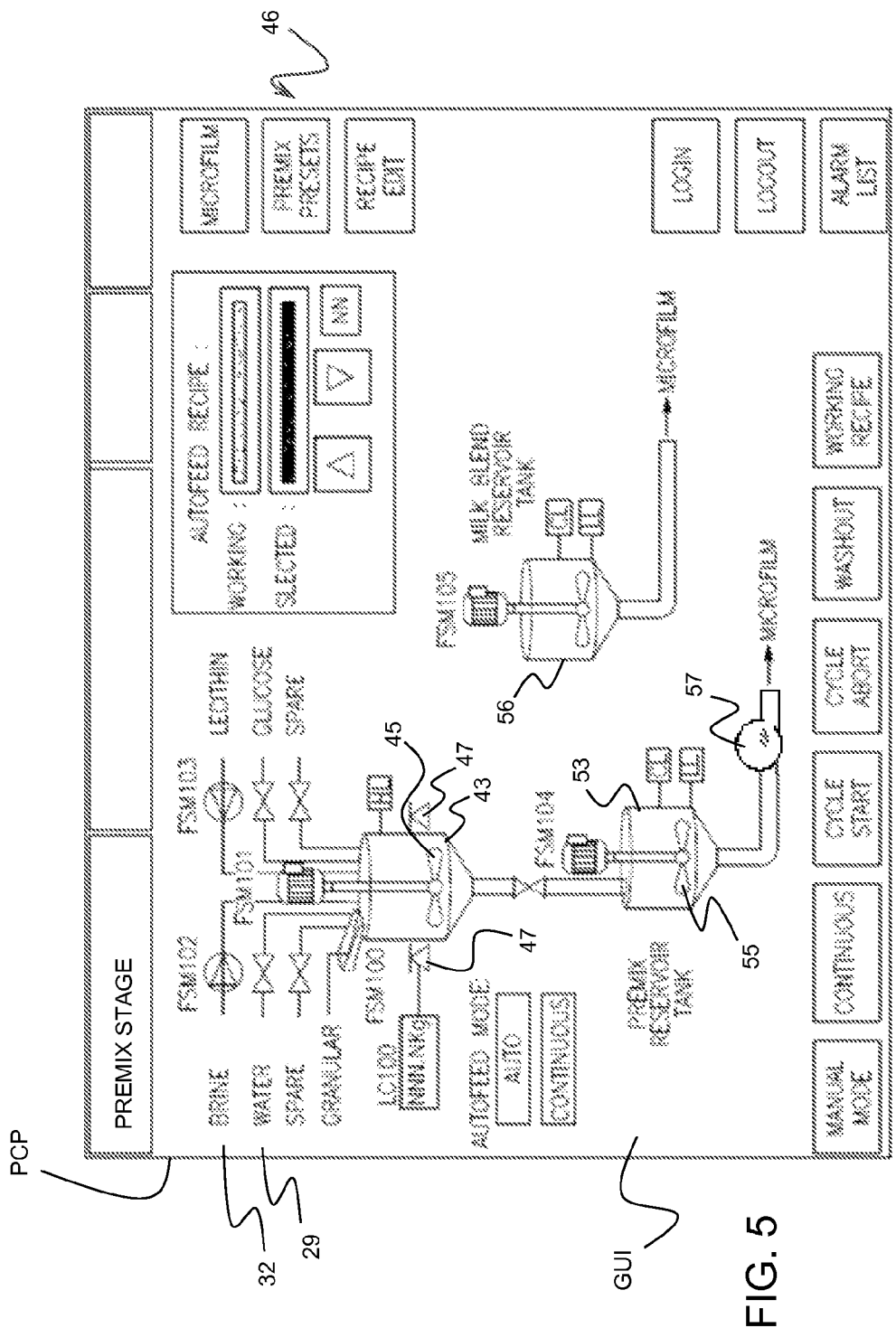
FIG. 5 is a diagrammatic representation of the premix portion of the lollipop depositing apparatus of the present invention.

As shown in FIGS. 4-5, the first premix stage is the ingredient mixing and cooking which originates from the initial product storage of the three main ingredients for the candy slurry. The heated glucose storage tank 33 is provided to maintain a large volume of corn syrup in a semi-viscous state for introduction into an initial mixing/weigh tank 43 where sugar (sucrose) is added to the corn syrup. The corn syrup in the storage tank is maintained at a desired temperature of about 150 degrees F. and 200 degrees F. so that the corn syrup has a low enough viscosity to be pumped to the weigh tank 43 by a conventional fluid pump such as a 40 hp positive displacement rotary pump, although other sizes and types of pumps could be used. The pump delivers the heated glucose syrup through an insulated piping system 42 to the initial autofeed weigh tank 43. It is to be appreciated that the syrup storage tank 33 is preferably of a volume significantly greater than the initial weigh tank 43 so that additional syrup shots may be provided to the weigh tank 43 once the initial syrup and sugar mixture is passed farther along the first stage and downstream of the initial weigh tank 43. As will be described in further detail below this ensures a relatively continuous supply of candy slurry through the process and apparatus and to the cooking and depositing stages 35, 37.

The initial weigh tank 43 includes a mixer 45 as well as a plurality of load cells 47 for determining and maintaining a preprogrammed syrup and ingredient weight. For example a single batch may call for 180 kg of syrup which is weighed separately from other additional ingredients such as sugar and any other additives such as brine or lecithin for example. The sugar and other ingredients is then weighed and added to the syrup, and other liquid additives may be weighed and metered into the slurry on a timed basis. The individual weighing provides accuracy by ensuring there is automatic in-flight compensation for each ingredient as well as maintaining a pre-programmed weight tolerance for each ingredient.

Figure 6:
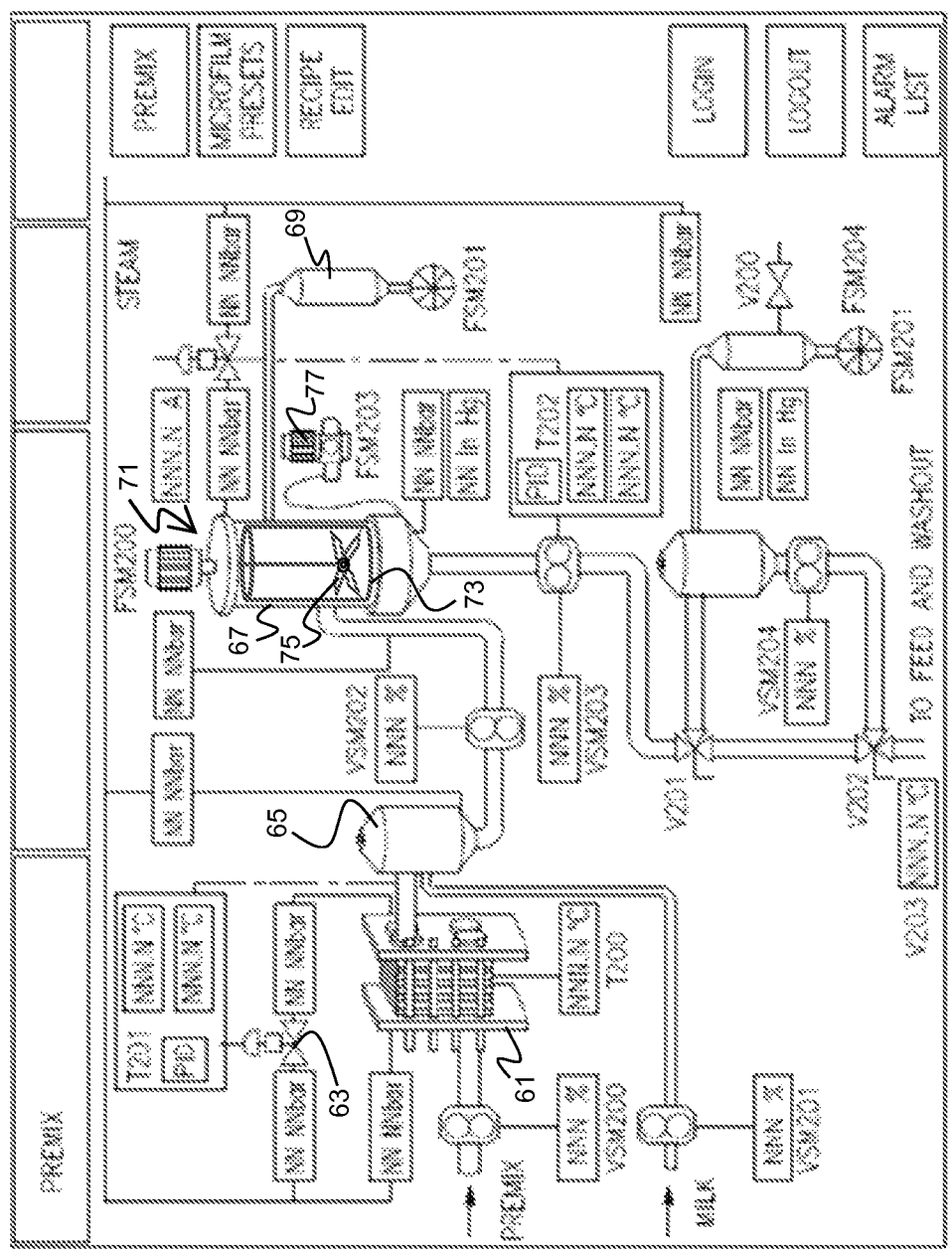
FIG. 6 is a diagrammatic representation of the microfilm cooker portion of the lollipop depositing apparatus of the present invention.
Figure 7:
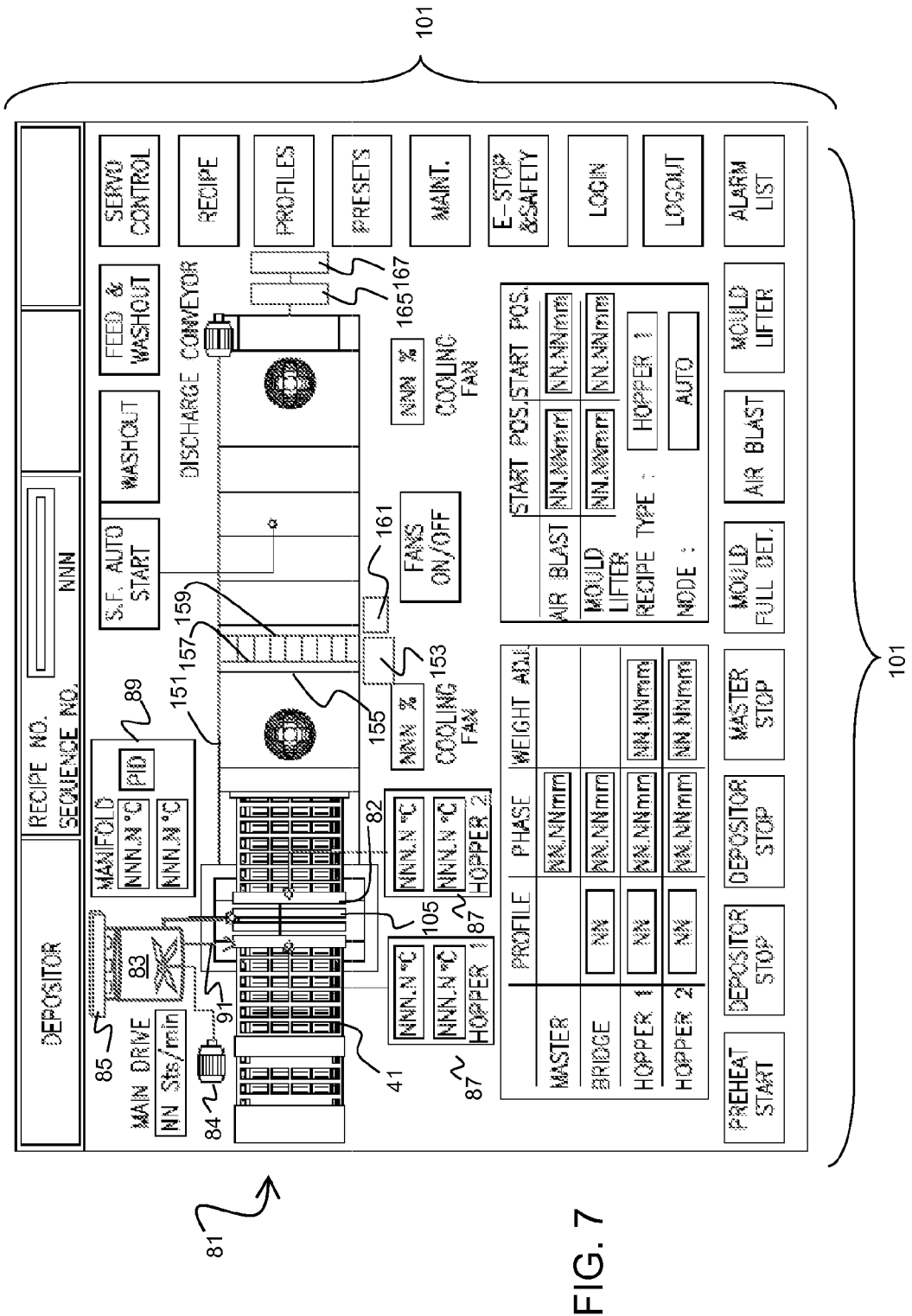
FIG. 7 is a diagrammatic representation of the PCP screen for the depositor portion of the lollipop depositing apparatus of the present invention.

The process controller C includes a process control panel (PCP) supporting a digital graphical user interface (GUI) as represented in the drawings of FIGS. 5-7. The PCP as shown by FIG. 5 allows for the operators monitoring and use, i.e. inputs, and receives and displays all the weight data and controls valves or related delivery devices for each of the ingredients into the weigh tank via servo-motors based according to either preprogrammed instructions or via input from an operator. The process controller C may also have a preprogrammed settle time for the ingredients as well as a mixer start time and duration for premixing of the introduced ingredients. A further description of the process controller C and PCP is provided below.

The lollipop hard outer shell, whether it has a soft chewy center or not, is generally made of known glucose and sugar ingredients. The manufacturing process includes initial preparation of the slurry generally being an aqueous supersaturated solution of the hard outer shell ingredients. The primary ingredient in the product is a sweetener, which can be for example sucrose, sugar alcohols, fructose, corn syrup, invert sugar, intensive natural or synthetic sweeteners, or a combination of these ingredients. Other ingredients may include fats and or vegetable oils, such as milk fat and coconut oil, for texture and mouth feel. By way of example, a conventional composition of the slurry in an aqueous supersaturated solution can be in the range of about 45% to about 70% by weight sucrose, about 30-55% by weight corn syrup, and 0 to about 3% by weight flavoring and/or coloring agent.

Returning to FIG. 5 another ingredient addition in this premix stage 31 is hot water 29 to the weigh tank 43. The hot water 29 is added to facilitate the syrup and slurry being maintained at desired temperature, about 205 degrees F., and to some extent diluted for easier mixing with the granulated sugar. The granular sugar commercially referred to as sucrose, may be produced from beets, cane or other sugar producing plants and legumes. The sugar, syrup and hot water are introduced in separate ingredient runs into the weigh tank 43 where these ingredients are stirred with a beater mechanism in the tank to initially comingle the ingredients into the candy slurry. The weigh tank 43 provides initial ingredient and slurry data to the process controller C to ensure the appropriate ingredient ratio and slurry conditions are provided to the system. These are displayed for example in the PCP as an Autofeed Recipe box and amendments to the controller program and the recipe may be entered by a user through function key(s) 46 such as "Recipe Edit". Besides the load sensors 47, i.e. weight sensors, the weigh tank 43 may include flow rate sensors and temperature sensors to provide flow rate data, weight data and temperature data for each separate ingredient as well as for the complete slurry volume introduced into the weigh tank 43. It is to be appreciated that other sensors and material measurement devices may be utilized in conjunction with the weigh tank 43 to ensure the proper ingredients mixing and environmental conditions for preparing the initial candy slurry.

Once the initial slurry is weighed and initially prepared in the weigh tank 43 it is provided via gravity feed or even mechanical pump to a reservoir tank 53 where a beater or mixer 55 provides a further vigorous mixing of the slurry to ensure that no consolidated mass of granulated sugar remains in the slurry. A gravity feed is preferred at this stage from the weigh tank 43 as any pumps which provide the candy slurry through the remainder of the process can be easily damaged by any solids, such as a solid mass of sugar which has not been reduced to a semi-viscous fluid in the weigh and reservoir tanks 43, 53 respectively. Also a milk blend reservoir tank 56 may be provided as an additional ingredient such as milk fat and coconut oil, for texture and mouth feel. Such ingredients are usually added to the slurry in the microfilm cooker 36 described below.

From the reservoir tank 43 the slurry is pumped via a slurry transfer pump 57 to a critical element of the process, the microfilm dissolver/cooker 36, where the slurry temperature is raised to reduce the water content of the slurry to a point where the candy slurry can be "hard-cracked". The term "hard-cracked" generally means that upon cooling to room temperature the slurry will harden to a solid which is a preferred method of forming the final lollipop body or shell. The cooker as shown in the GUI on the PCP disclosed in FIG. 6, consists of a plate heat exchanger 61 mounted in a frame, together with steam control valves and condensate fittings 63. In general, the candy slurry is heated in the heat exchanger to liberate the water from the slurry which enables the slurry to get to the "hard crack" state. The cooker includes a flash chamber 65 where the aqueous slurry is allowed to atmospheric flash and as known in the art, a specific amount of heat energy is released for each lower pressure condition and the heat energy that is release causes "flash steam", which is a percentage of condensate in the slurry being re-evaporated into flash steam at a lower pressure.

From the flash chamber 65 the slurry is passed to a microfilm cooker 67 which is a highly efficient heat exchanger suitable for cooking confectionary recipes without any fouling of the heat exchange surfaces. The microfilm cooker 67 includes a vacuum pump and indirect condenser 69, jacketed discharge pump and steam controls. The microfilm cooker 67 has a thin film evaporator 71 which has a brass heat exchange surface. Confectionary syrup is pumped into the top of the evaporation unit and falls under gravity down through a steam jacketed tube 73. As the slurry falls it is swept against the tube wall by hinged blades 75 attached to a high speed rotor running inside the tube 73. The action of the blades 75 sweeps a thin film of slurry product against the tube surface, resulting in high heat transfer rates and hence very short cooking times—typically less than 10 seconds. Film thickness is less than 1 mm, which prevents burning of any products in the recipe. The cooked slurry is discharged by a manually inverted controlled variable speed discharge pump 77 fitted below a stainless steel collecting chamber with observation windows at the base. The indirect vacuum condenser 69, for example a shell and tube condenser, and pump can be included for cooking under vacuum where up to 7" Hg can be applied.

Once cooked, the slurry is passed to an incorporator which includes a feed system 81 and a depositor 82 as shown in FIG. 7 where volatile flavors can be added to the cooked slurry. The feed system 81 includes a mixing cylinder 83 which consists of a variable speed rotor with a series of pegs, the pegs rotate inside the cylinder 83 and a manifold 85 on top of the cylinder 83 defines a plurality of injection points for color/flavor additives as well as an insertion point for a temperature probe 89. The cylinder 83 is heated by steam passing through a copper coil in contact with the external surface. A stainless steel outer sheet (not shown) covers the heating coil. The rotor is driven by a variable speed electric motor 84. The drive casing contains the rotor shaft supported on ball bearings, with a food quality gland preventing leakage from the mixing cylinder. A powder feeder may also be added to the cylinder to add solid particulates into the candy slurry in the cylinder.

The feed system 81 also includes a two-way split mixing cone feed provided to take the cooked candy slurry and feed it to the depositor hoppers 87. The single candy slurry stream from the mixing cylinder 83 is split into two streams for instance for striped candy, where each stream is provided with individual additional flavor/color additives via a stainless steel feed tipper chute which splits the single stream candy slurry into two streams and also includes two additive systems for metering in colors and flavors. The color and flavor is provided into each separate stream with two stainless steel baffled pre-mixers. Each stream then passes through a rotary mixing cone assembly which mixes in the color/flavor addition. Each stream is then fed into respective depositor hoppers 87 through a stainless steel discharge. It is to be appreciated that the feed system can include a third or potentially fourth stream of candy slurry as well, for instance where a soft chewy center is to be incorporated within the lollipop body. The feed apparatus for introducing each of the separate candy slurry streams into the depositor and hence into the mold(s) 41 is generally mounted on a steel frame above the depositor 81 and is complete with an access ladder and walkway for purposes of servicing the feed system and apparatus.

The progress of the candy slurry throughout the entire system and the separate color/flavor slurry streams through the feed system can be monitored by the process controller C and monitored and adjusted by an operator via the process control panel (PCP) as shown in FIGS. 5-7 for example. The PCP is an operator interface which permits adjustment of the manufacturing process and ingredients as desired. A preset program may automatically run the entire system and allow for alterations, operator input and overrides to the ingredients and mixing, cooking and depositing process depending on the circumstances. The PCP will include the GUI diagrammatically representing the feed apparatus and all kitchen processes through a number of different screens, the screens shown in FIGS. 5-7 being examples of such screens. Each screen will show a preset system representation which diagrammatically mimics the system or a portion thereof and highlights all desired operating parameters. All system functions can be operated via function keys 101 from the screen including speed demands for the variable frequency drives which can be entered using numeric input keys. All alarms are displayed as a text message on the PCP and also can be viewed on an alarms summary page. A proportional-integral-derivative controller (PID controller) used in known industrial control systems is accessible via the PCP and each loop will have a PID template on the GUI where all associated values can be entered.

After the feed apparatus 81, the depositor 82 is positioned to form and cool confectionary pieces from the cooked syrup on an automatic and continuous basis. The depositor 82 consists of a continuously moving mold circuit with each mold 41 passing under a depositing head 105 mounted over the mold circuit. The depositing head 105 reciprocates to maintain synchronization with the mold cavities during the deposit stroke. The depositing mechanism consists of a series of volumetric pumps operating submerged in each of the hoppers 87 containing a specified amount of cooked syrup with desired flavor/color additives. The pumps move a predetermined amount of syrup from the hopper 87 respective through a manifold assembly to an injector nozzle (not shown) which deposits the cooked syrup into the mold 41. In one embodiment of the present invention there are three hoppers, each containing eighteen pumps, and one hopper with a split partition and two rows of eighteen pumps across. The manifold assembly may consist of a plurality of manifolds with certain manifolds specifically designed for different portions of the lollipop such as a soft-chewy center fill or the hard outer shell of the lollipop. It is to be appreciated that the manifolds may have different nozzles to facilitate the depositing of different portions of the lollipop.

Depositing of lollipops has many distinct advantages over other methods of forming lollipops. First, the above described process is continuous and gives consistent product quality with low scrap rates. The lollipops have excellent mouth feel due to the deposition process and very smooth exteriors of the lollipops. The deposited pops have a highly consistent piece weight and shape which improves wrapping efficiency. Labor requirements are minimal and the manufacturing apparatus is space efficient. Furthermore, the PCP allows almost all parameters, including deposit weight of the individual cooked candy components of the lollipop into the mold, to be controlled during operation of the production line without stoppage so that there is no interruption of the manufacturing process.

Figure 8:
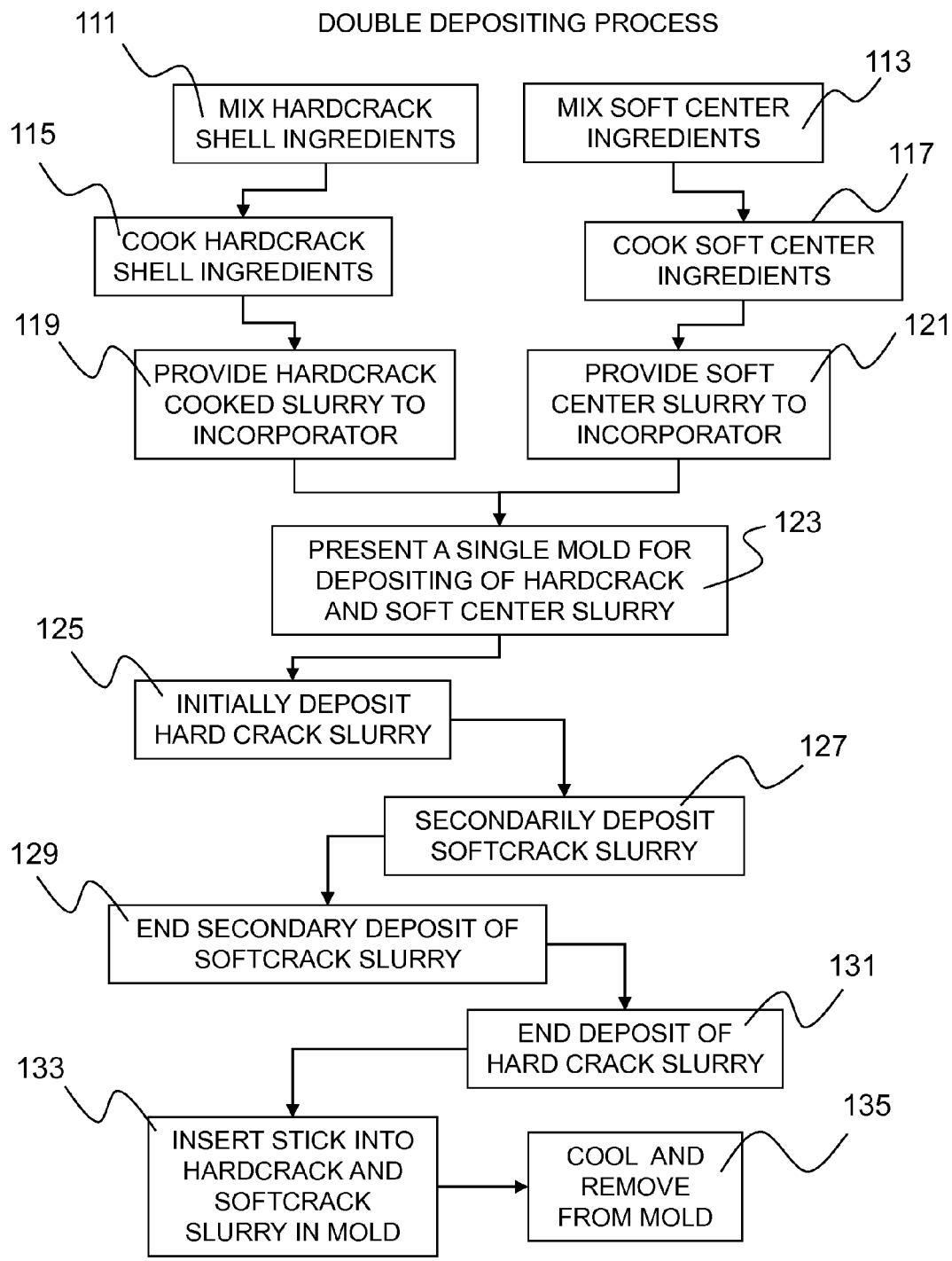
FIG. 8 is a flow diagram of a double depositing process.

The double depositing process as shown in FIG. 8 includes a number of steps to form the deposited lollipop with a soft chewy center. This is accomplished by programming a specifically timed depositing format for the deposition of a first hard-crack shell slurry from the desired respective hopper and the deposition of a second soft-center slurry from a second respective hopper so that the entire second soft-center slurry is contained within the deposition of the first slurry in a semi-aqueous state. Then, together the first and second candy slurry is cooled to hard-crack condition to form the outer shell of the lollipop body, while maintaining the second slurry inside the cavity of the outer shell in the semi-aqueous state ensuring a delicious soft, chewy candy center portion of the deposited lollipop. The ingredients for the hard-crack outer shell are mixed at step 111, and the ingredients for the soft-center are mixed at step 113, it is to be appreciated that these steps can take place in any order or contemporaneously with one another. The hard-crack shell ingredients are cooked separately from the soft center ingredients at steps 115 and 117 respectively, and then separately provided to the incorporator and depositor at step 119 and 121.

At step 123 a single lollipop mold is presented to receive both the soft center slurry and the hard-crack shell slurry. In order to fully encompass the soft center within the shell the hard-crack shell slurry is initially deposited at step 125 and subsequently at step 127 the deposit of the soft-center slurry is begun into the mold in direct contact with the hard-crack shell slurry. At step 129 the soft-center slurry depositing is ended and the hard-crack shell slurry continues until step 131 when the hard-crack slurry entirely encompasses the soft-center slurry and the depositing of the hard-crack slurry is ended. A lollipop stick is added into both the hard-crack and soft-center slurry at step 133 and the entire lollipop is cooled in the mold and removed from the mold at step 135.

The outer shell of the lollipop may be either a single flavor/color or as described above and shown in FIG. 3 a multi-flavor/color embodiment as previously described with alternating non-uniform adjacent segments.

Figure 9:
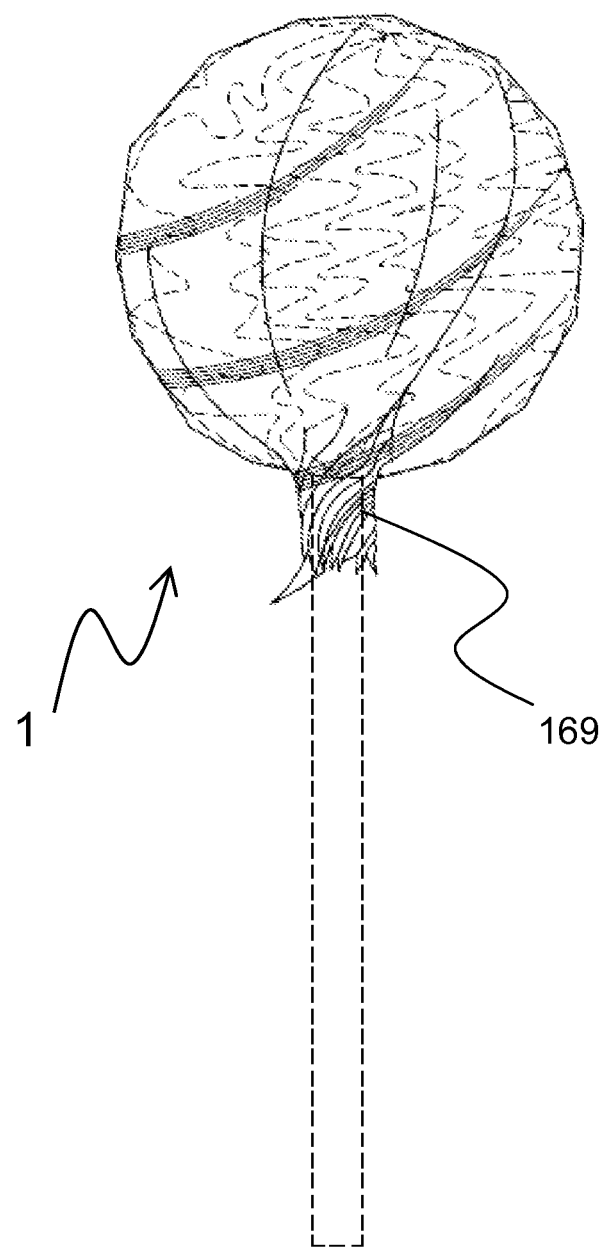
FIG. 9 is a respective view of the lollipop within a transparent packaging material to facilitate complete viewing of the lollipop product outer surface.

Returning to FIG. 7, after depositing into the mold, the mold circuit continues into a stick feeder 151 which inserts the stick 9 into each of the cooling lollipops. The automatic stick feeder 151 includes a stick distribution hopper 153 with removable lid for manual filling with sticks. A push bar 155 sends the sticks to individual insertion tubes 157 which deliver the sticks to a reciprocating insertion bar 159 mounted between two linear modules with a single servo-motor drive. The insertion bar 159 is speed matched and positionally aligned with the mold circuit by means of an encoder 161 mounted on mold carrier bars on the mold circuit. A control system for the servo-motor and reciprocating insertion bar 159 and pneumatic timing of the stick insertion is provided via an operator interface screen including alarms for changing and retrieving sticks. Subsequent to the stick insertion, the lollipops are cooled and ejected from the molds and then passed through a polisher 165 and then onto a wrapping apparatus 167 for wrapping the lollipop. The lollipop wrapping may be a transparent packaging material 169 to facilitate complete viewing of the lollipop product outer surface as shown in FIG. 9.

The invention has been described in detail with particular reference to certain preferred embodiments thereof, but it will be understood that variations and modifications can be effected within the spirit and scope of the invention.

I claim:

1. An apparatus for the production of a candy comprising:
    a controller to add one or more ingredients to a premix tank to form a slurry;
    a feed to transport the slurry to a mixer;
    a transfer pump to transport the slurry to a microfilm dissolver having a flash chamber to reduce the water content of the slurry;
    a steam jacketed tube to cook the slurry;
    a discharge pump to transport the slurry to a mixing cone, the mixing cone having a feed tipper chute to split the slurry into at least two streams;
    a feed system to add color and flavor additives to the slurry;
    a plurality of depositor hoppers for receiving the slurry each hopper having a volumetric pump;
    a depositor having a plurality of molds; and
    wherein a candy is formed by starting and stopping the discharge of slurry into one of the plurality of molds from at least a first depositor hopper pump;
    subsequently starting and stopping the discharge of slurry into the same mold from at least a second depositor hopper pump; and
    subsequently starting and stopping the discharge of slurry into the same mold from at least the first depositor hopper pump.

2. The apparatus for the production of a candy as set forth in claim 1, wherein the one or more ingredients are each in one of a plurality of weight tanks and the controller adjusts the amounts of the one or more ingredients by weight.

3. The apparatus for the production of a candy as set forth in claim 1, further comprising subsequently starting and stopping the discharge of slurry into the same mold of the plurality of molds from at least a third depositor hopper pump.

4. The apparatus for the production of a candy as set forth in claim 1, wherein the feed system further comprises a mixing cylinder having a manifold with a plurality of injection points for the addition of color and flavor additives.

5. The apparatus for the production of a candy as set forth in claim 1, wherein the feed system further comprises a powder feeder to add solid particulates to the slurry.

6. The apparatus for the production of a candy as set forth in claim 1, wherein the feed tipper chute directs at least one stream of the slurry to a rotary mixing cone to mix color and flavor additives.

7. The apparatus for the production of a candy as set forth in claim 1, further comprising a stick feeder.

8. The apparatus for the production of a candy as set forth in claim 1, wherein feed through the apparatus is continuous.

* * * * *